Patented Jan. 9, 1951

UNITED STATES PATENT OFFICE 2,537,012

COMPOSITE REFRACTORY AND METHOD OF BONDING THE SAME

Leslie W. Austin, San Jose, and James C. Hicks, Menlo Park, Calif., assignors to Kaiser Aluminum & Chemical Corporation, a corporation of Delaware No Drawing. Application June 20, 1947, Serial No. 756,098

17 Claims. (Cl. 106—59)

This invention relates to improvements in high temperature basic refractories, and it relates particularly to improvements in such refractories comprising in the aggregate, or grain material, portions at least two components.

It has long been common practice to employ chromite (one of the group of natural spinel minerals usually comprising the oxides of the divalent magnesium, iron and possibly manganese and zinc, in combination with the oxides of the trivalent chromium, iron and aluminum) as a refractory material for metallurgical furnaces. Chromite provides a relatively cheap and easily available source of the highly refractory and chemically neutral spinel-type minerals. There are, however disadvantages inherent in the mineral as commonly employed. These disadvantages include a weakness of bond at moderately high temperatures (i. e., shear at 1400° C. to 1450° C. on standard hot-load test under 25#/sq. in. load) and poor resistance to thermal spalling.

Both of these disadvantages stem in part from the character of the natural ore, which almost universally comprises two components: The chromite spinel mineral and serpentine, which is a hydrous magnesium silicate. The serpentine usually occurs in such close relationship with the chromite that it is not practical to separate the two constituents by the usual mineral dressing techniques, at least for refractory purposes. The serpentine of the ore softens at around 1400° C., and is also susceptible to cracking upon alternate heating and cooling, which weaknesses are correspondingly imparted to the ore.

Recently it has been the practice, in an attempt to overcome these weaknesses, to employ a mixture of chromite with magnesia. When from about 20% to 80% of magnesia (generally in the form of highly calcined magnesite) is employed with the chromite, and more particularly, when the fine chromite is omitted and magnesia is used to supply the fine fraction of the batch, the resistance to thermal spalling and to load at high temperatures is improved. This improvement is due to the formation of forsterite from a substantial part of the serpentine by reaction with the magnesia.

In the co-pending application of Austin and Hicks, Serial Number 756,099, it has been shown that improved chrome-magnesia refractories are obtained by employing with a chrome grain material a bonding agent comprising a mixture of finely divided magnesia and a chromium compound which is soluble in the liquid employed to temper the refractory mix. However, while the methods described above are improvements over the older art and are advantageous in many installations, some circumstances arise in which their advantages are not obtained or are substantially diminished. For one thing, a forsterite bond has a high refractoriness of itself and adheres well to periclase grains but it is observed that it adheres less tenaciously to the chrome component. With respect to the magnesio-chromite bond, it can be said that it appears to satisfy both chrome and magnesia grains, as will be discussed further below but it has been observed that the action of this bonding agent is impaired by higher concentrations of silica at the surface of the periclase grains.

According to the present invention, it has now been found that the decreasing effectiveness of the magnesia-chrome bonds in the presence of increasing concentrations of silica at the surfaces of the grains, or where there is improper distribution of silica in the grain material, can be overcome or corrected by incorporating in a refractory composition comprising as principal refractory ingredient a mixture of spinel and magnesia grain materials, a bonding component comprising finely divided magnesia, a chromium compound soluble in the liquid employed to temper the mix, and finely divided silica.

The minerals which provide the spinel grain material are relatively so inert that it is difficult to achieve a strong ceramic or mineral bond which will adhere to or bond onto the spinel grains. When microscope studies are made of thin sections of chrome-magnesia refractories for example, wherein the bond is forsteritic, it is seen that most of the surfaces of the chrome grains are clean and free from bond. Most of the strength of the bond in such chrome-magnesia refractories comes, then, from the forsterite formed from the finely divided magnesia and the serpentine component of the chromite grain material, or from the magnesia and the added finely divided silica. Even this bond with serpentine is not as strong in practice as it might be, because it is impracticable to fire the refractories to the time and temperature schedule necessary to bring the serpentine-magnesia reaction to equilibrium. Because of the difficulty of reaching with magnesia the serpentine which is dispersed in the chromite in order to effect reaction, complete equilibrium is unlikely even with fusion of the serpentine. Therefore, under these circumstances, lack of strength of the bond derives from one or both of two causes: (1) the chromite is not bonded to, and (2) the magnesia-forsterite component, which provides the principal strength of the refractory, may not have reached reaction equilibrium and therefore will not have attained its maximum resistance to spalling.

When the chromite bond of Serial Number 756,099 is provided it is observed that the chrome grains, as well as the periclase grains, are well bonded to, and a strong overall bonding effect is established. This is believed to be for the reason that magnesio-chromite is at least an effective constituent of the ceramic bond and, inasmuch as it contains a magnesia and a chromium oxide component, it is compatible with both periclase and chrome grains. It has been observed, however, that bonding of magnesio-chromite to forsteritic periclase grains (i. e. periclase grains in which the internal bond of the grain is forsterite) is detrimentally affected by increasing amounts of silica in these periclase grains, particularly, it is believed, where the silica is increased at the surface of the grains. The advantages of the magnesio-chromite bond are diminished with respect to intermediate strength and spalling resistance when the silica content of the forsteritic periclase grain exceeds about 4%.

It is believed that the magnesia, chrome compound and finely divided silica of this invention interact upon firing to provide a multiple bond comprising a spinel- or magnesiochromite-forming part and a forsterite-forming part. In a spinel-magnesia or chrome-magnesia refractory, the spinel part of the bonding agent is believed to bond onto the spinel, or chromite, grain, and the forsterite part, onto the periclase grain. However, the finely divided silica, probably because of its great surface activity, appears to effect some specific orientation of the bonding forces within the refractory mass because the bond of this invention provides greatly increased spalling resistance and excellent hot load bearing strength, as well as increased strength at intermediate temperatures. The exact mechanisms by which these advantageous effects are obtained, or the exact relationships set up within the bonded mass, are not clearly understood. Increased abrasion resistance, because of stronger bonding to the chrome grains, is another advantage especially when the products are used in rotary kilns.

The bonding composition comprises finely divided magnesia, finely divided silica and a chromium compound which is soluble in the liquid to be used for tempering the mix. When water is the tempering liquid, a water-soluble chromium compound is used, which preferably contains chromium in the negative radical. Advantageously, the chromium compound is magnesium chromate or a compound which will yield magnesium chromate with magnesia. As little of the chromium compound as will correspond to $\frac{1}{8}$% of $Cr_2O_3$ in the total refractory composition is useful, and as high an amount of chromium compound can be added as will dissolve to give a saturated solution in the tempering liquid. That is to say, the chromium compound is added in an amount from that which yields $\frac{1}{8}$% $Cr_2O_3$ in the fired product up to that which provides a saturated solution in the tempering liquid, or in the tempering water. The chrome compound is ordinarily added to the batch in solution in the tempering liquid, although in the case of ramming mixes, mortars, or the like, it can be incorporated in the dry state, if desired, and water or other liquid added just prior to use. The spinel component of the bond, probably $MgO.Cr_2O_3$, is formed upon heating by combination of the soluble chrome compound and a portion of the finely divided magnesia.

The forsterite component of the bond is formed by combination of the finely divided magnesia and the finely divided silica. The silica employed is preferably amorphous silica, the particles of which are substantially all below 44 microns in diameter, and a major proportion of the particles are below 10 microns in diameter. The silica should preferably contain at least 95% of $SiO_2$ on the ignited basis. A preferred silica is that deposited from the vapor phase as a finely divided amorphous product, so-called volatilized silica, having an average particle size of less than 1 micron diameter. Such silica is conveniently prepared by reducing unsuitable forms of silica, i. e., massive or crystalline silica, by reaction with a reducing agent such as carbon or silicon, to form silicon monoxide vapor, withdrawing the vapors from the reducing zone and reoxidizing to obtain amorphous, finely divided silica. Instead of, or in combination with, volatilized silica there can be employed other silicas, of the desired particle size, such as, for example, finely ground rice hull ash. The amount of silica employed varies with the refractory being made and is roughly proportional to the amount of periclase used. When the aggregate component of the refractory composition comprises predominantly chromite grains and a minor proportion of periclase grains, as little as 1.0% of silica is added. The amount of silica increases with increase in periclase and when the periclase grains are the predominating constituent with a minor proportion of chromite grains, up to about 5.0% of silica is added.

The finely divided magnesia required for the bond can be added as such to the mix for that purpose, or it can be supplied by the finest fraction of the periclase employed in the batch. The magnesia serving as a bonding constituent should be substantially all finer than 200 mesh, or less than 74 microns diameter in particle size, and at least a major portion should be finer than 325 mesh, or less than 44 microns diameter in particle size. At least sufficient of the magnesia constituent of the bonding agent should be present to combine with the soluble chromium compound to yield magnesium chromite, $MgO.Cr_2O_3$, with all of its chromium, and to combine with all of the fine silica of the bond to yield forsterite, $2MgO.SiO_2$. In practice a considerable excess of fine magnesia is present, and a part of this excess serves to correct at least a part of the secondary component of the chromite, the serpentine, changing it under heat to forsterite. The chrome compound solution yields a chemical bond even with periclase material when the latter is finely divided, but to secure more rapid bonding, or when using a Sorel cement as an additional chemical bond, a more active finely divided magnesia may be added. Preferably this magnesia should contain at least 95.0% magnesium oxide, should be substantially all finer than 325 mesh, and should have an ignition loss of not more than about 0.5%, that is, it should be hard-burned, rather than dead-burned, magnesia and should exhibit an activity which is higher than "dead-burn" but low as measured by iodine adsorption. Advantageously a small part of the magnesia constituent of the bonding component can be added in the form of a precipitated magnesium compound yielding magnesia upon heating, for instance, magnesium carbonate or hydroxide. Apparently due to the relatively fine particle size or active nature of the magnesia formed upon heating the magnesia-yielding compound, the formation of the mineral bond by reaction with the chrome compound is facilitated.

Only a small proportion of the convertible magnesium compound, for instance, not over 3.0% based on the weight of the total dry ingredients is added, to avoid excessive shrinkage. Further advantages of adding the precipitated material, which is finely divided, are that it lubricates the mix during forming and effects a denser structure, and that it initiates formation of the mineral bond at lower temperatures.

The spinel grain material can comprise either natural or manufactured spinels of sufficiently high refractoriness, such as chromite grains, magnesium aluminate, magnesium chromite, and the like. The term chromite is intended to mean any of the group of natural chromium-containing spinel minerals. The spinel grain material can also comprise periclase grains in which the inter-crystalline bond is essentially a spinel such as magnesium aluminate, magnesio-ferrite, or magnesio-chromite for example. It is preferred to use an ore material analyzing under 5% silica, although higher amounts of silica may be tolerated when the physical structure of the ore is favorable.

The forsteritic periclase grain employed is crystalline magnesia and can be obtained by firing magnesite ore, brucite, seawater magnesia or magnesium hydroxide or other substance yielding magnesia upon firing. The fired magnesia is crushed to the desired grain size or sizes. With the periclase grain, also, best performance is obtained with high-purity periclase, i. e., containing less than 4% of silica. However, this is not always available or inexpensive enough for the application desired and the advantages of the present invention are particularly evidenced in working up periclase grains containing silica in amounts exceeding 4.0%. Other impurities generally found in association with magnesia, for instance lime, iron and alumina, are preferably low in amount in order to maintain the characteristically periclase nature of the grain.

In making up refractory compositions according to the invention, a batch of refractory grains comprising spinel and periclase is made up in the usual manner. The composition of the batch can vary depending upon the service for which it is intended. For example, the batch may range from about 80% of a chromite ore and 20% of periclase (or dead-burned magnesia) to about 20% chromite and 80% periclase. In general, with the bond provided by the invention, with the higher amounts of chrome ore the best spalling resistance is obtained, and with the higher amounts of periclase the best high temperature load-bearing strength is obtained, although both results are also affected by the qualities of the raw materials employed.

In preparing the refractory composition, the preferred procedure is to wet the batch of refractory grains with the solution of the chromium compound, and then to blend in the fine magnesia and silica to uniformly coat the moistened grains. The material is then, if desired, pressed into shape, preferably at high unit pressures, for example, at pressures of over 5000 lbs. per square inch, and the shapes are allowed to harden. After this they may be dried, for example at 300°–350° F., and are then ready for use. If a fired refractory is desired the articles are advantageously fired at from 1200° C. to 1700° C.

The following examples will demonstrate the refractory compositions according to this invention and the method of the invention.

In one example, chromite ore, containing less than about 4% silica, is crushed and ground to yield the desired sizes, so that 50 parts by weight are finer than 4 mesh and coarser than 14 mesh, and 20 parts are finer than 14 mesh and coarser than 40 mesh. Periclase grain material assaying 90% magnesium oxide and 6% silica, and containing not more than 2.0% CaO and not more than 1.0% each of $Fe_2O_3$ and $Al_2O_3$, is crushed and ground to yield 10 parts finer than 14 mesh and coarser than 40 mesh, and 20 parts finer than 200 mesh. The periclase grains are mixed with the chromite grains.

The grain mixture is blended together in a pan mixer and is then wet with a solution of ¾ part by weight of chromium trioxide dissolved in 3 parts of water. To the moistened grains are added 3 parts of hard-burned magnesia, analyzing about 97.0% MgO and having an ignition loss of 0.5%, and 1.5 parts of volatilized silica which is finer than 325 mesh and has a major portion finer than 1 micron in diameter. The mixing is continued until the grains are uniformly coated with the fine bonding materials, at which time the batch is pressed into shapes under a pressure of 10,000 pounds per square inch. The shapes harden in a few hours and are then dried at 300°–350° F. for several hours. Drying is advantageously carried out in a tunnel drier with a controlled temperature-humidity-time cycle. After drying, the shapes are ready for installation in a furnace. They are stable in storage if kept reasonably dry. They can, if desired, be fired to 1200° C. or higher in order to produce a fired refractory.

Table I sets forth the spalling losses and the temperatures at which the bricks fail by shear under a standard load of 25 pounds per square inch, the tests being made on chrome-periclase brick made as described in Example I, but varying only in the composition of the bond as shown.

*Table I*

| Test No. | Bond Composition Parts by Weight | | | | Spalling Loss Per Cent by Weight | Hot Load Shear at ° C. |
|---|---|---|---|---|---|---|
| | Silica | $MgCl_2$ | MgO | $CrO_3$ | | |
| 1 | 3.0 | 2.0 | 3.0 | 0.0 | 14.4 | 1,670 |
| 2 | 1.5 | 0.0 | 3.0 | 0.75 | 2.6 | 1,675 |
| 3 | 1.5 | 2.0 | 3.0 | 0.0 | 29.5 | 1,640 |
| 4 | 0.0 | 0.0 | 3.0 | 0.75 | 24.8 | 1,645 |
| 5 | 1.5 | 1.0 | 3.0 | 0.33½ | 9.6 | 1,665 |

In the above bond compositions, the silica is the so-called volatilized, or amorphous, silica obtained by deposition from the vapor phase and having an average particle size of less than 1 micron diameter; the MgO is hard-burned magnesia analyzing about 97.0% MgO and having an ignition loss of 0.5%.

It will be noted from Table I that the bonding compositions containing in combination with magnesia, both the fine silica and chromium oxide (tests 2 and 5) exhibit low spalling losses and high hot load strengths. When either the silica or the chrome is omitted, one or the other, or both, results are sacrificed.

Table II sets forth the improved intermediate strength obtained with the bond of this invention. The test numbers refer to the correspondingly numbered compositions as given in Table I. In each column is given the crushing stress in pounds per square inch, determined on the bricks after firing to the indicated temperatures and then cooling.

Table II

| Test No. | 110° C., Lbs./Sq. In. | 750° C., Lbs./Sq. In. | 1000° C., Lbs./Sq. In. | 1300° C., Lbs./Sq. In. |
|---|---|---|---|---|
| 1 | 3,800 | 3,000 | 2,375 | 4,550 |
| 2 | 5,800 | 4,550 | 4,500 | 4,050 |
| 4 | 4,750 | 2,300 | 1,785 | 5,025 |
| 5 | 3,300 | 3,125 | 4,200 | 4,975 |

This table shows the superiority of the bonds of this invention with respect to the load bearing strength at intermediate temperatures. That is to say, the bricks will perform well upon firing in place.

In another example, a periclase-chrome refractory is prepared by using grain materials of the same composition as in the previous example, but in the proportions and sizes as follows: The chromite is crushed to pass a 4-mesh screen but be retained on a 14-mesh screen. The periclase is crushed and ground and there are selected 24 parts passing 4-mesh and retained on 14-mesh, 14 parts passing 14 mesh and retained on 40 mesh, and 25 parts passing 200 mesh. The 63 parts of periclase and 27 parts of the chromite grains are blended in a pan-type mixer and wet with a solution of 1 part of chromium trioxide dissolved in 3 parts of water. The moistened grains are then coated with 2 parts of volatilized silica and 4 parts of hard-burned magnesia. The batch is pressed, cured, dried and further handled as in the first example. The bricks made according to this example also exhibit increased intermediate strength and improved spalling results, as well as excellent hot load strength.

When desired, the amount of chromium compound used can be reduced to as little as will furnish only ⅛% $Cr_2O_3$ in the fired composition. In some cases, as when less than about 0.5% $Cr_2O_3$ is furnished by the soluble chromium compound, it is helpful to employ another binder in addition, to give higher unfired, or green, strength. Such binder can comprise, for instance, 1% of magnesium chloride in solution in the tempering water in addition to the chromium compound, or it can comprise another component which will yield a Sorel cement or a chemical bond. The chromium compounds useful in this invention include chromic acid, magnesium chromate, magnesium dichromate, ammonium chromate and dichromate, the chromates and dichromates of the alkaline earths, chromium nitrate, chloride and sulfate, and the like. The salts containing chromium in the positive radical are somewhat more difficult to use because they give a faster set in air; and it is preferred to add chromium compounds containing chromium in the negative radical. Chromic acid, magnesium chromate, magnesium dichromate, ammonium chromate and ammonium dichromate are particularly desirable compounds for the bonding composition, because they perform well and, also, add no constituent other than magnesia and chromium oxide in the final fired refractory. The chromium compounds useful in this invention do not include the alkali metal compounds containing chromium, because these latter yield undesired low-melting alkali silicates upon firing.

The forsteritic periclase grain employed is crystalline magnesia containing as impurities principally silica, iron oxide, lime and alumina. It is to be understood that these oxides are present in the periclase not necessarily as the discrete oxides but more probably in combination with each other in such compounds as monticellite ($CaO.MgO.SiO_2$), forsterite ($2MgO.SiO_2$), pyroxenes and the like, with possible solid solutions of some of the constituents in others. The invention can be practiced with any periclase of "brickmakers" grade or better. It is preferred to use material low in lime, iron and alumina, for example, not more than 2.0% CaO, and not more than 1.0% $Fe_2O_3$ or $Al_2O_3$. Especially advantageous results are obtained when the silica content does not exceed 8.0% provided the other impurities present do not exceed a total of about 2.0%, or in other words, provided the magnesium oxide content is at least 90.0%.

In the specification and claims, all parts and percentages are by weight. In conformity with common practice in reporting chemical analyses of refractory materials, in the specification and claims the proportions of the various chemical constituents present in a material are expressed as though these constituents were present as the simple oxides. Thus, the magnesium constituent is expressed as magnesium oxide or MgO, the chromium constituent as $Cr_2O_3$, the silicon constituent as $SiO_2$ and so on, although the silica or chrome and a small proportion of the MgO, for example, may be present in combination with each other or with another minor constituent.

What is claimed is:

1. A refractory composition containing as the principal refractory ingredient an aggregate comprising a mixture of periclase grains and a grain material chosen from the group consisting of chromite, magnesiochromite, and magnesium aluminate, and as bonding components finely divided magnesia, a chromium compound free of alkali metal compounds and soluble in the tempering liquid for said composition in an amount from that which yields ⅛% $Cr_2O_3$ in the fired product to that which forms a saturated solution in the tempering liquid, and from 1% to 5% finely divided silica, the particle size of said silica being substantially entirely less than 44 microns diameter and a major proportion being less than 10 microns in diameter, said finely divided magnesia being present in at least an amount to form upon firing magnesium chromite with said chromium compound and magnesium orthosilicate with said fine silica.

2. A refractory composition containing as the principal refractory ingredient an aggregate comprising a mixture of periclase grains and chromite grains, and as bonding components finely divided magnesia, a water-soluble chromium compound free of alkali metal compounds in an amount from that which yields ⅛% $Cr_2O_3$ in the fired product to that which forms a saturated solution in the tempering water, and from 1% to 5% finely divided silica, the particle size of said silica being substantially entirely less than 44 microns diameter and a major proportion being less than 10 microns in diameter, said finely divided magnesia being present in at least an amount to form upon firing magnesium chromite with said chromium compound and forsterite with said fine silica.

3. A refractory composition containing as the principal refractory ingredient an aggregate comprising forsteritic periclase grains containing at least 90.0% magnesia and not over 8.0% silica and chromite grains, and as bonding components finely divided magnesia, a water-soluble chromium compound free of alkali metal compounds in an amount from that yielding ⅛% $Cr_2O_3$ in the fired product to that forming a saturated solution in the tempering water, and from 1% to 5% finely divided silica, the particle size of said finely divided silica being substantially entirely less than 44 microns diameter and a major proportion being less than 10 microns in diamter, said finely divided magnesia being present in at least an amount to form upon firing magnesium chromite with said chromium compound and forsterite with said fine silica.

4. A refractory composition containing as the principal refractory ingredient an aggregate comprising forsteritic periclase grains containing at least 90.0% magnesia and not over 8.0% silica and chromite grains, and as bonding components finely divided hard-burned magnesia containing at least 95.0% magnesium oxide, a water-soluble chromium compound free of alkali metal compounds in an amount from that yielding $\frac{1}{8}$% $Cr_2O_3$ in the fired product to that forming a saturated solution in the tempering water, and from 1% to 5% finely divided silica, the particle size of said finely divided silica being substantially entirely less than 44 microns diameter and a major proportion being less than 10 microns in diameter, said finely divided magnesia being added in at least an amount to form upon firing magnesium chromite with all of said chromium compound and forsterite with all of said fine silica.

5. A refractory composition containing as the principal refractory ingredient an aggregate comprising a mixture of periclase grains and chromite grains, and as bonding components finely divided magnesia, a water-soluble chromium compound free of alkali metal compounds in an amount from that yielding $\frac{1}{8}$% $Cr_2O_3$ in the fired product to that forming a saturated solution in the tempering water, and from 1% to 5% finely divided amorphous silica having an average particle size of less than 1 micron diameter, said finely divided magnesia being present in at least an amount to form upon firing magnesium chromite with said chromium compound and forsterite with said fine silica.

6. A refractory composition containing as the principal refractory ingredient an aggregate comprising a mixture containing 20% to 80% periclase grains and 80% to 20% chromite grains, and as bonding components finely divided magnesia, and a water-soluble chromium compound, free of alkali metal compounds, in an amount from that which yields $\frac{1}{8}$% by weight of chromium as $Cr_2O_3$ in the total dry ingredients up to that which provides a saturated solution in the tempering water for said composition, and from 1.0% to 5.0% by weight of finely divided, amorphous silica having an average particle size of less than 1 micron diameter, said magnesia being present in at least an amount to form upon firing magnesium chromite with said chromium compound and forsterite with said fine silica.

7. Composition as in claim 6 wherein the chromium compound is chromium trioxide.

8. Composition as in claim 6 wherein the chromium compound is magnesium chromate.

9. Process of preparing an unfired refractory composition which comprises blending in a batch periclase grains and chromite grains, adding thereto a solution of a chromium compound, free of alkali metal compounds, in a tempering amount of water to wet the blended grains, and then adding from 1% to 5% finely divided, amorphous silica having an average particle size of less than 1 micron diameter and finely divided magnesia to uniformly coat the wetted grains, and shaping the batch, said chromium compound being added in an amount from that yielding $\frac{1}{8}$% $Cr_2O_3$ in the fired product to that forming a saturated solution in said water, and said fine magnesia being added in at least an amount to form upon firing magnesium chromite with said chromium compound and forsterite with said silica.

10. Process as in claim 9 wherein the chromium compound is chromium trioxide.

11. Process as in claim 9 wherein the chromium compound is magnesium chromate.

12. A fired refractory product containing as its principal refractory ingredients periclase grains and chromite grains bonded together by a bonding composition composed essentially of magnesium orthosilicate, magnesio-chromite and magnesia.

13. A fired refractory product containing as its principal refractory ingredients periclase grains and chromite grains bonded together by a bonding composition composed essentially of magnesium orthosilicate and magnesiochromite.

14. Process of preparing a fired refractory product which comprises blending in a batch periclase grains and chromite grains, adding thereto a solution of a chromium compound, free of alkali metal compounds, in a tempering amount of water to wet the blended grains, and then adding from 1% to 5% finely divided amorphous silica having an average particle size of less than 1 micron diameter and finely divided magnesia to uniformly coat the wetted grains, shaping the batch, and firing at a temperature of from 1200° C. to 1700° C., said chromium compound being added in an amount from that yielding $\frac{1}{8}$% $Cr_2O_3$ in the fired product to that forming a saturated solution in said water, and said fine magnesia being added in at least an amount to form upon firing magnesium chromite with said chromium compound and forsterite with said silica.

15. A refractory bonding composition comprising finely divided magnesia, a water-soluble chromium compound free from alkali metal compounds, and finely divided amorphous silica having an average particle size of less than 1 micron diameter, said fine magnesia being present in at least an amount to form upon firing magnesium chromite with said chromium compound and forsterite with said fine silica.

16. A refractory bonding composition comprising finely divided magnesia, a water-soluble chromium compound free of alkali metal compounds, and finely divided amorphous silica, the particle size of said silica being substantially entirely less than 44 microns diameter and a major proportion being less than 10 microns in diameter, said magnesia being present in at least an amount to form upon firing magnesium chromite with said chromium compound and forsterite with said silica.

17. A refractory bonding composition as in claim 16 wherein not over 3% of the finely divided magnesia is replaced by a precipitated magnesium compound yielding magnesia upon heating.

LESLIE W. AUSTIN.
JAMES C. HICKS.

REFERENCES CITED

The following references are of record in the file of this patent:

UNITED STATES PATENTS

| Number | Name | Date |
|---|---|---|
| 1,853,521 | Stewart | Apr. 12, 1932 |
| 1,853,522 | Stewart | Apr. 12, 1932 |
| 2,234,080 | Mitchell et al. | Mar. 4, 1941 |